(12) United States Patent
Itoh et al.

(10) Patent No.: US 8,154,858 B2
(45) Date of Patent: *Apr. 10, 2012

(54) ELECTRONIC DEVICE AND ELECTRONIC SYSTEM

(75) Inventors: Yuusuke Itoh, Kobe (JP); Yukisuke Ozaki, Kobe (JP); Kohji Miyazato, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 413 days.

This patent is subject to a terminal disclaimer.

(21) Appl. No.: 12/385,405

(22) Filed: Apr. 7, 2009

(65) Prior Publication Data

US 2009/0257205 A1 Oct. 15, 2009

(30) Foreign Application Priority Data

Apr. 10, 2008 (JP) .................. 2008-102866
May 23, 2008 (JP) .................. 2008-134878

(51) Int. Cl.
*H05K 5/00* (2006.01)

(52) U.S. Cl. .............. 361/679.01; 606/159; 248/137; 312/223.2

(58) Field of Classification Search .......... 361/679.01, 361/679.56, 679.21, 679.02, 741, 747, 759, 361/679.31, 679.33; 369/75.1, 75.2, 77.1; 720/646, 647; 248/917, 133, 135, 137, 522; 381/361; 307/9.1, 10.1; 455/346; 606/1, 606/159, 113, 131, 167, 85; 312/223.2, 332.1; 451/241, 287

See application file for complete search history.

(56) References Cited

U.S. PATENT DOCUMENTS

| 6,683,390 B2 * | 1/2004 | Miura ...................... 307/10.2 |
| 7,724,505 B2 * | 5/2010 | Chigasaki et al. ....... 361/679.01 |
| 7,885,057 B2 * | 2/2011 | Itoh ....................... 361/679.01 |

FOREIGN PATENT DOCUMENTS

| JP | A-8-318792 | 12/1996 |
| JP | A-11-311540 | 11/1999 |
| JP | A-2001-239895 | 9/2001 |
| JP | A-2002-149325 | 5/2002 |
| JP | A-2002-328026 | 11/2002 |
| JP | A-2003-166848 | 6/2003 |
| JP | A-2005-173653 | 6/2005 |
| JP | A-2005-524570 | 8/2005 |
| WO | WO 03/094286 A2 | 11/2003 |

* cited by examiner

*Primary Examiner* — Hung Duong
(74) *Attorney, Agent, or Firm* — Oliff & Berridge, PLC

(57) ABSTRACT

An electronic device includes: an accommodation section that detachably accommodates a portable device; an eject unit that ejects the portable device accommodated in the accommodation section; and a guide mechanism that guides the portable device so that a first side of the portable device is positioned in the accommodation section and a second side thereof opposite to the first side is ejected from the accommodation section. The eject unit is arranged behind the accommodation section, and the accommodation section has an opening through which the second side of the portable device accommodated in the accommodation section is exposed.

15 Claims, 16 Drawing Sheets

ELECTRONIC DEVICE AND ELECTRONIC SYSTEM

BACKGROUND OF THE INVENTION

1. Field of the Invention

The present invention generally relates to an electronic device and an electronic system, and more particularly to an in-vehicle electronic device and an in-vehicle electronic system.

2. Description of the Related Art

Widely known conventional navigation devices include small-sized portable navigation devices that are called personal navigation devices and can be carried around though their structures are simple, and in-vehicle navigation devices that are accommodated and secured in the concave portions (DIN openings) formed in the dashboards of vehicles. Each of the in-vehicle navigation devices can perform a highly precise guiding operation, with the assistance of information such as vehicle speed information supplied from the vehicle. Some of the newly suggested in-vehicle navigation devices are equipped with audio devices.

In recent years, navigation devices that have the portability of the portable navigation devices and the highly sophisticated guiding performance of the in-vehicle navigation systems have been developed.

Japanese Unexamined Patent Publication No. 8-318792 (Reference 1), Japanese Unexamined Patent Publication No. 2002-328026 (Reference 2), Published Japanese Translation No. 2005-524570 of the PCT international publication for a patent application (Reference 3), and Japanese Unexamined Patent Publication No. 2001-239895 (Reference 4) disclose structures each having a navigating unit that can be detached from a in-vehicle device mounted on a vehicle. Detached from the in-vehicle device, the navigating unit can be used as an independent portable navigation device.

Japanese Unexamined Patent Publication No. 2003-166848 (Reference 5) discloses a structure in which a navigation device can be detached from a vehicle, and can be used while the user is walking. While the navigation device is mounted in the vehicle, the navigation device operates in a car navigating mode. When detached from the vehicle, the navigation device operates in a human navigating mode.

Japanese Unexamined Patent Publication No. 2005-173653 (Reference 6) discloses an in-vehicle device having a storage portion defined by a recess that is provided on the front surface of the in-vehicle device and is opened upward. A portable part that is a navigation part is operated to slide in the accommodation section through the opened upper side of the in-vehicle device and is detachable placed in position.

SUMMARY OF THE INVENTION

The present invention has been made in view of the above circumstances.

According to an aspect of the present invention, there is provided an electronic device including: an accommodation section that detachably accommodates a portable device; an eject unit that ejects the portable device accommodated in the accommodation section; and a guide mechanism that guides the portable device so that a first side of the portable device is positioned in the accommodation section and a second side thereof opposite to the first side is ejected from the accommodation section, the eject unit being arranged behind the accommodation section, and the accommodation section having an opening through which the second side of the portable device accommodated in the accommodation section is exposed.

According to another aspect of the present invention, there is provided an electronic system comprising a portable device, and an electronic device that detachable holds the portable device, the electronic device including: an accommodation section that detachably accommodates the portable device; an eject unit that ejects the portable device accommodated in the accommodation section; and a guide mechanism that guides the portable device so that a first side of the portable device is positioned in the accommodation section and a second side thereof opposite to the first side is ejected from the accommodation section, the eject unit being arranged behind the accommodation section, and the accommodation section having an opening through which the second side of the portable device accommodated in the accommodation section is exposed.

According to yet another aspect of the present invention, there is provided an in-vehicle electronic device including: a main unit; and a front-face unit provided on a front side of the main unit, the front-face unit including an accommodation section having a recess for detachably accommodating a portable device, the accommodation section having an opening through which one of right and left sides of the portable device is exposed in a state in which the portable device is accommodated in the accommodation section.

According to a further aspect of the present invention, there is provided an in-vehicle electronic system comprising a portable device and an in-vehicle electronic device, the in-vehicle electronic device including: a main unit; and a front-face unit provided on a front side of the main unit, the front-face unit including an accommodation section having a recess for detachably accommodating the portable device, the accommodation section having an opening through which one of right and left sides of the portable device is exposed in a state in which the portable device is accommodated in the accommodation section.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of preferred embodiments of the present invention, with reference to the accompanying drawings. It should be noted that the scope of the present invention is not limited to the embodiments described below, and is defined in the claims and their equivalents.

First Embodiment

Figure 1:
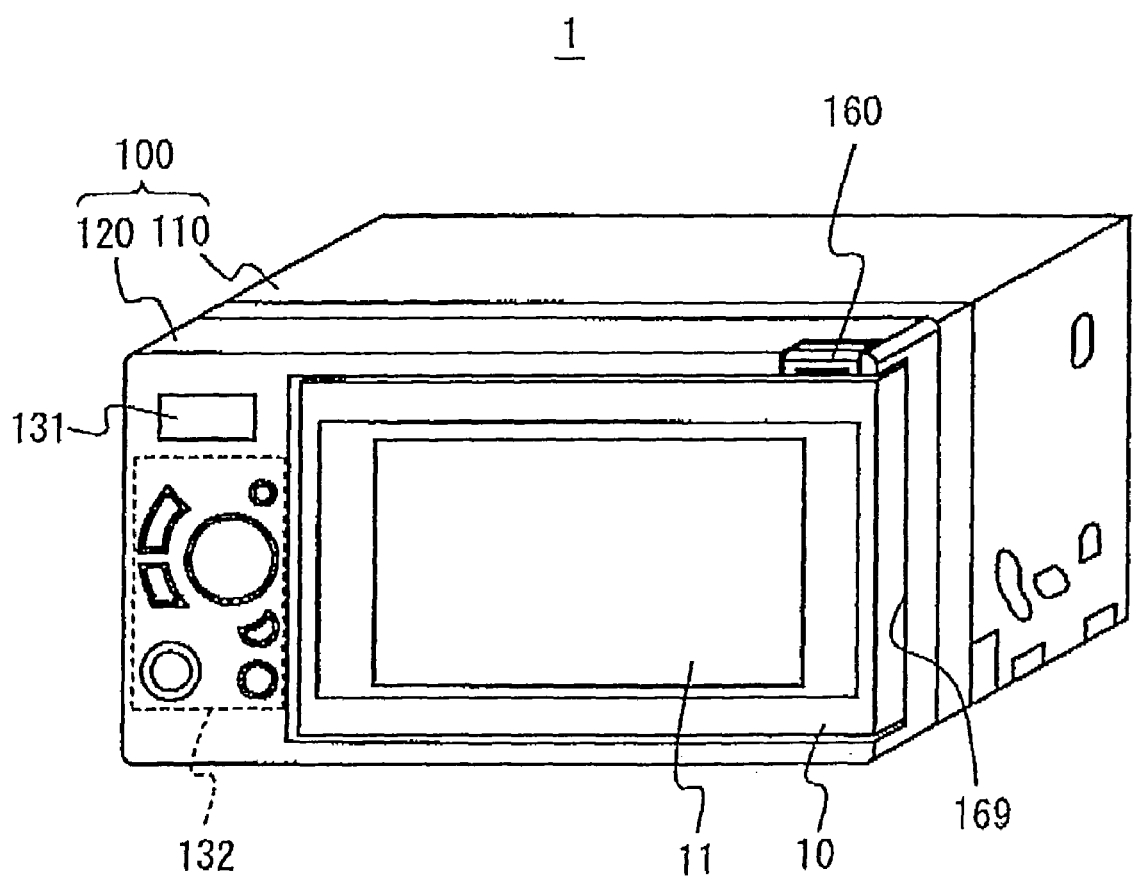
FIG. 1 illustrates an external view of an in-vehicle system.

FIG. 1 illustrates the external appearance of an in-vehicle system 1 that is an example of an electronic system.

As depicted in FIG. 1, the in-vehicle system 1 includes an in-vehicle device 100 (an electronic device or an in-vehicle electronic device) that is mounted on a vehicle, and a portable device 10 (a portable electronic device or an in-vehicle portable device) that has navigating functions. The portable device 10 can be attached to the front-face unit 120 (a cap unit) of the in-vehicle device 100 as depicted in FIG. 1. The portable device 10 can also be detached from the in-vehicle device 100 as depicted in FIG. 1B, and can be used independently of the in-vehicle device 100.

The in-vehicle device 100 may be an in-vehicle audio device that reproduces music data, for example. The in-vehicle device 100 is a device that can reproduce radio broadcasting, or a device that can reproduce music data written on a recording medium such as a CD (Compact Disc). The in-vehicle device 100 includes an in-vehicle main unit 110 (the main unit) that has a CD reproducing unit and a CD insertion/ejection slit, and the front-face unit 120 that has a display unit 131 and an operation unit 132. The portable device 10 has navigating functions, including the function of searching for a guide route to a destination and the function of displaying the guide route superimposed on a map.

Figure 2:
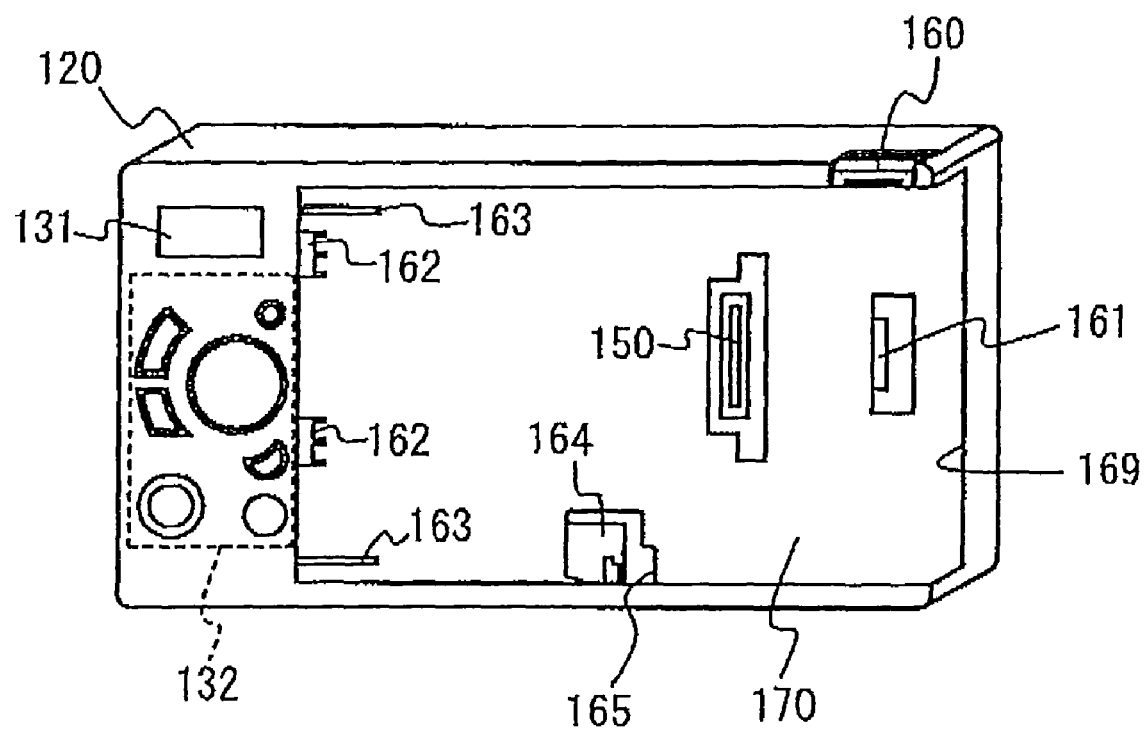
FIG. 2 shows a portable device detached from the in-vehicle device.

FIG. 2 illustrates the front-face unit 120 of the in-vehicle device 100, in which the portable device 10 has been detached from the in-vehicle device 100, more specifically the front-face unit 120. An accommodation section 170 that has a concave portion formed to accommodate the portable device 10 is provided on the front-face unit 120 of the in-vehicle device 100. This an accommodation section 170 has a connector 150 for electrically connecting the in-vehicle device 100 and the portable device 10, and a lock 161 and two ribs 162 for fixing the portable device 10 to the front-face unit 120. Further, the accommodation section 170 has slopes 163 for guiding ends of the portable device 10 to the ribs 162, and an eject unit 164 for ejecting the portable device 10 forwards from the accommodation section 170 from the backside thereof.

An escape vent 165 for escaping the eject unit 164 is formed in the accommodation section 170. The two ribs 162 are respectively located at two positions on the left side of the accommodation section 170. The slopes 163 are arranged so that the two ribs 162 are vertically interposed therebetween. Each of the ribs 162 has three protrusions arranged in parallel.

When a detachment button 160 provided on the front-face unit 120 is pressed, the lock 161 is released, so that the portable device 10 can be detached from the in-vehicle device 100. The accommodation section 170 has an opening 169 through which the right side of the portable device 10 placed in position in the accommodation section 170 is exposed. The opening 169 will be described in detail later.

Figure 3:
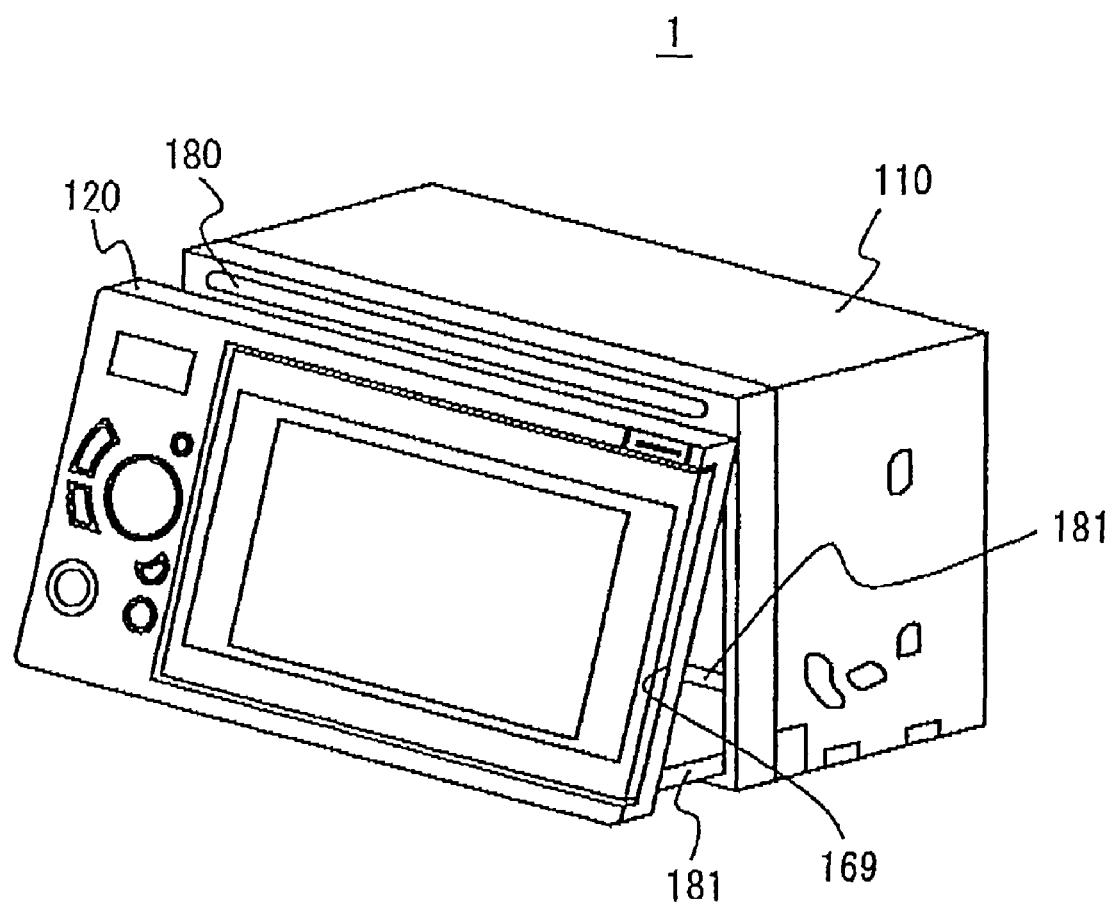
FIG. 3 shows a situation in which a front-face unit of the in-vehicle device tilts with respect to an in-vehicle device main unit, and a CD insertion/ejection slit is exposed.

FIG. 3 illustrates a situation in which the front-face unit 120 is tilted with respect to a main unit 110, so as to expose an insertion/ejection slit 180. The front face unit 120 can be tilted with respect to the main unit 110 by driving a slider 181 by a driving mechanism. The tilting operation allows the insertion/rejection slit 180 to be exposed so that a disk-shaped recording media can be inserted into and ejected from the main unit 110. An operation button (a tilt/eject button 132a illustrated in FIG. 6) is provided on the front-face unit 120 of the in-vehicle device 100, and a desired tilt angle can be set by handling this button.

Figure 4:
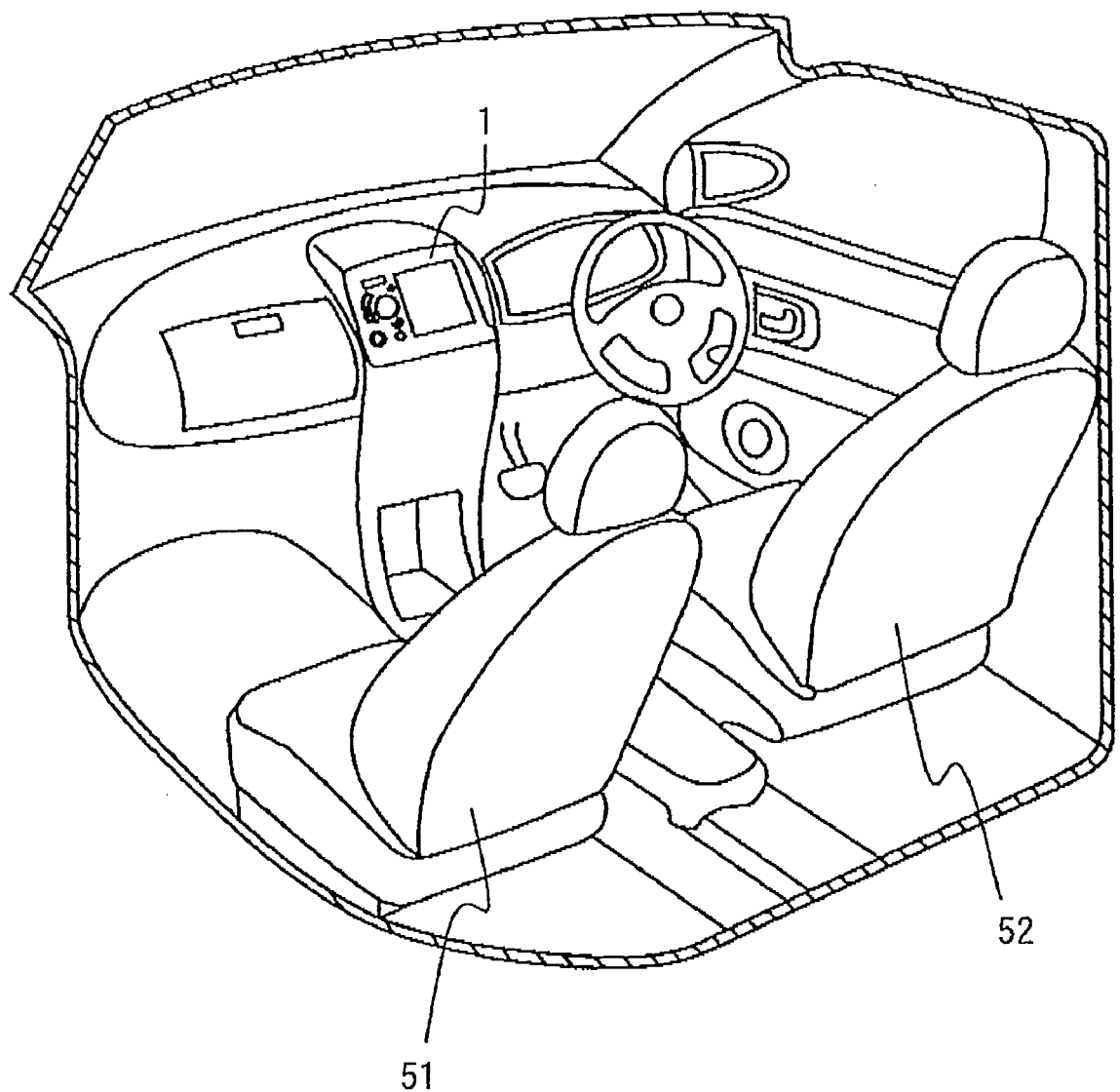
FIG. 4 shows an example case where the in-vehicle system is mounted on a vehicle.

FIG. 4 illustrates an exemplary case where the in-vehicle system 1 is mounted in a vehicle. As illustrated in FIG. 4, the in-vehicle system 1 may be provided in a dashboard area located substantially at the mid point between a driver seat 52 and a front passenger seat 51. Although not illustrated in the drawing, the GPS antenna of a GPS information receiving unit 133 (described later) is provided on the dashboard or is attached to the inner face of the windshield.

Figure 5:
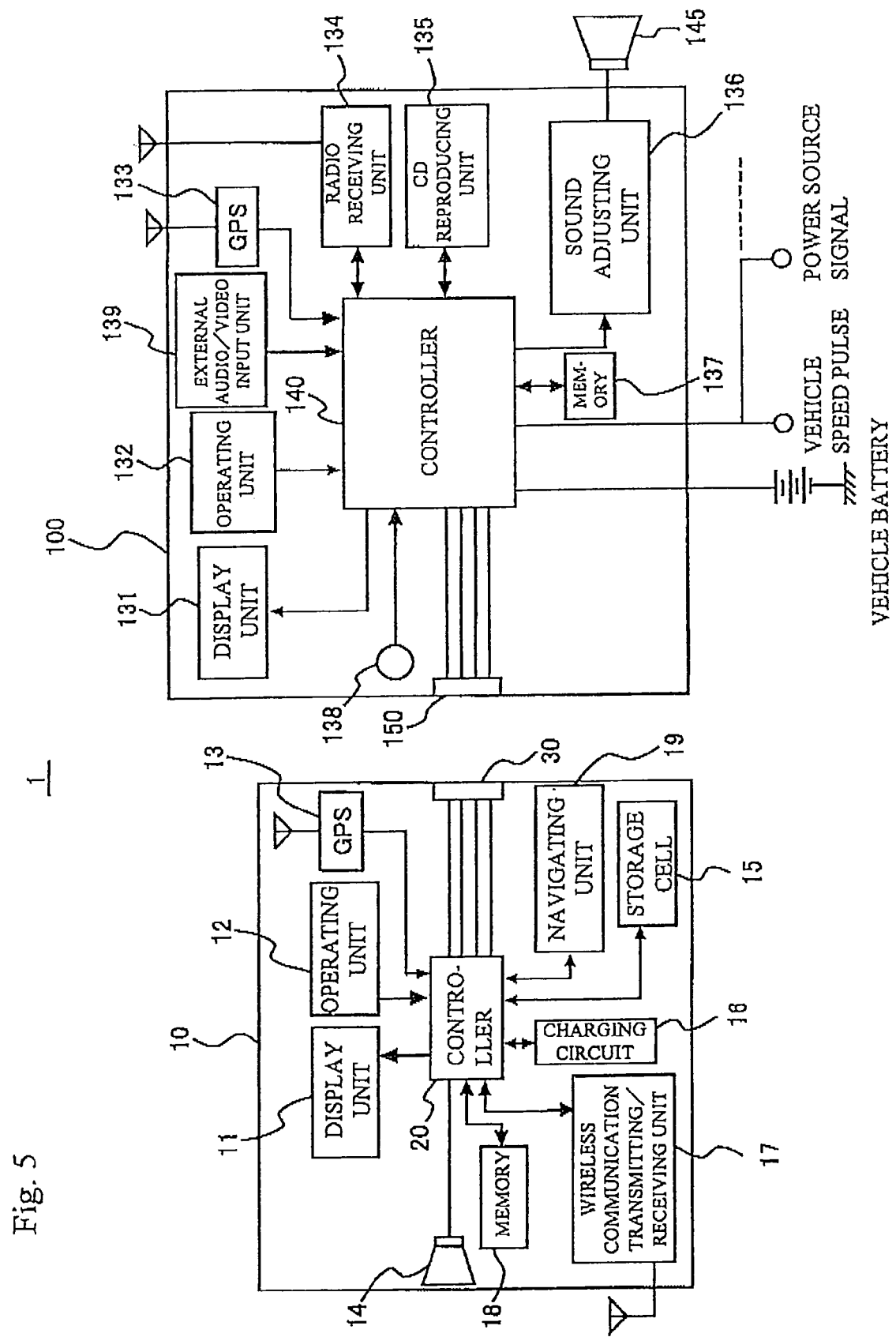
FIG. 5 is a block diagram schematically illustrating the structure of the in-vehicle system.

FIG. 5 is a block diagram schematically showing the structure of the in-vehicle system 1.

The in-vehicle device 100 and the portable device 10 are electrically connected to each other with connectors. The connector 150 is provided on the side of the in-vehicle device 100, and a connector 30 is provided on the portable device 10. Those connectors 150 and 30 are connected to each other, so that various signals are transmitted and received between the in-vehicle device 100 and the portable device 10, and the in-vehicle device 100 and the portable device 10 function as the in-vehicle system 1. Also, power supply terminals for supplying electric power from the battery of the vehicle to the portable device 10 are attached to the connectors 150 and 30. When the portable device 10 is connected to the in-vehicle device 100, and electric power is being supplied to the in-vehicle device 100, the electric power is also being supplied to the portable device 10 via the power supply terminal.

The in-vehicle device 100 includes the display unit 131, the operation unit 132, the GPS information receiving unit 133, a radio receiving unit 134, a reproducing unit 135, a sound adjusting unit 136, a memory 137, a microphone 138, an external audio/video input unit 139, a controller 140 (a controlling unit), the connector 150, and a stepping motor 190. When the engine key is located at Acc or IG position, electric power is supplied from the battery on the vehicle, and the in-vehicle device 100 is activated.

In the following, the functions of each component are described in detail.

The display unit 131 has a liquid crystal panel and a backlight, and displays the received broadcasting frequency, the reproduced tune track No., the reproduced tune title, and the likes.

Figure 6:
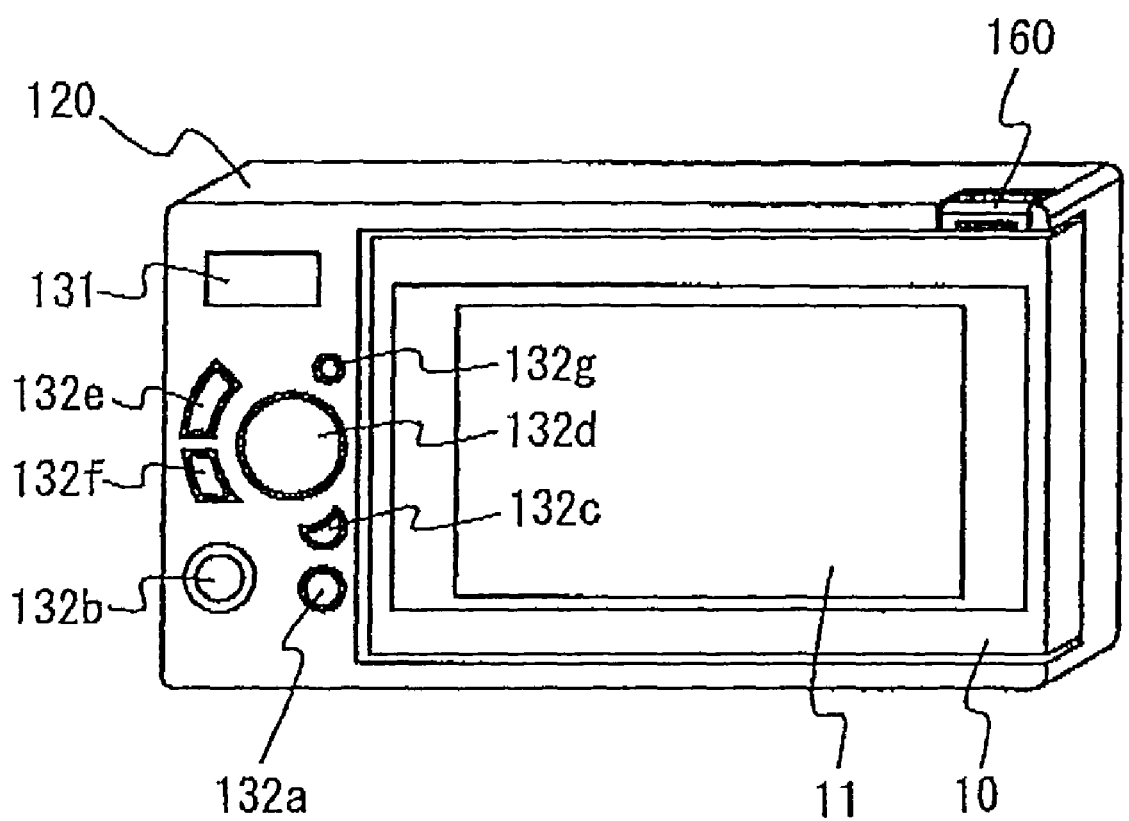
FIG. 6 shows an example of the front-face unit of the in-vehicle device.

The operation unit 132 is designed to perform an operation for switching operation modes of the in-vehicle device 100, and an operation in each selected mode. As depicted in FIG. 6, the operation unit 132 has a group of buttons including the tilt/eject button 132a, a band/tune button 132b, a TEXT button 132c, a SCREEN button 132d, a SOURCE/PWR button 132e, a CONTROL button 132f, and a MUTE/SCREEN OFF button 132g. The tilt/eject button 132a is used to tilt the front-face unit 120. The band/tune button 132 is used to change the radio frequency of the reproduced subject or the track of the recording media of the reproduced subject. The TEXT button 132c is used to change the title displayed on the display unit 131. The SCREEN button 132d is used to switch the image displayed on a display unit 11 to either the image of navigation or the moving image of DVD. The SOURCE/PWR button 132e is used to switch the subject source to be reproduced and power on/off the in-vehicle device 100. The CONTROL button 132f is used to control the tone. The MUTE/SCREEN OFF button 132g is used to cut audio and turn on/off the display unit 11.

Referring back to FIG. 5, the GPS information receiving unit 133 has a GPS antenna and a tuner unit, and receives GPS signals from satellites. Each GPS signal received by the GPS information receiving unit 133 is output to the navigating unit 19 of the portable device 10 via the controller 140, the connector 150, the connector 30, and a controller 20. Based on the GPS signal, the location of the vehicle on which the in-vehicle device 100 accommodating the portable device 10 is mounted is determined.

The radio receiving unit 134 has an antenna and a tuner unit, and receives broadcast wave such as AM broadcast wave, FM broadcast wave, or multiple broadcast wave. The radio receiving unit 134 then outputs an audio signal, receives and demodulates multiple data, and outputs a demodulated signal to the controller 140.

The reproducing unit 135 reproduces the data such as audio data and moving image data recorded on a recording medium such as a CD or DVD, and outputs a resultant reproduction signal to the controller 140. Alternatively, the demodulated signal that is output from the radio receiving unit 134 may be output to the later described sound adjusting unit 136, with the controller 140 being not involved.

The sound adjusting unit 136 performs signal processing such as sound volume adjustment or sound quality adjustment on the audio signal that is received and demodulated by the radio receiving unit 134 or the audio signal that is reproduced by the reproducing unit 135. The sound adjusting unit 136 then outputs the processed signal to a speaker 145. The memory 137 (a memory unit) can be formed with a RAM (Random Access Memory) on and from which data can be written and read. The information required for controlling operations, such as the tilting state of the front-face unit 120 (the tilt angle information indicating the tilt angle), is temporarily stored in the memory 137. The microphone 138 is designed for communication in a handsfree fashion, and captures the voice of users in the vehicle.

The external audio/video input unit 139 has a USB memory and a connection terminal for a connection to an external device such as a portable audio device. The external audio/video input unit 139 receives audio signals or data from an external device, and transmits the audio signals or data to the controller 140. The external audio/video input unit 139 also outputs control signals, audio signals, or data received from the controller 140 to a connected external device.

In accordance with an operation through the operation unit 132, the controller 140 controls the radio receiving unit 134, the reproducing unit 135, and the sound adjusting unit 136. The controller 140 also outputs various signals to the portable device 10 via the connector 150. Based on various signals that are input from the portable device 10, the controller 140 controls the in-vehicle device 100. For example, the controller 140 outputs a GPS signal that is received through the GPS information receiving unit 133 or an audio signal that is input through the microphone 138 to the portable device 10 via the connector 150.

Alternatively, an audio signal that is input through the microphone 138 may be output to the portable device 10 via the connector 150, with the controller 140 being not involved.

The controller 140 also receives a speech voice, via the connector 150, from a portable telephone device connected to the portable device 10. The controller 140 then outputs the speech voice to the speaker 145 via the sound adjusting unit 136. The controller 140 further obtains an operation signal for the menu screen of each mode to be displayed on the display unit 11 of the portable device 10, and controls the radio receiving unit 134 and the reproducing unit 135.

Electric power is supplied to the controller 140 from the battery mounted on the vehicle. If the portable device 10 is connected to the in-vehicle device 100, the controller 140 outputs the electric power from the battery to the portable device 10. A vehicle-speed pulse and an illumination source signal are also input from the vehicle to the controller 140. The controller 140 transfers the vehicle-speed pulse to the controller 20 of the portable device 10. Alternatively, the vehicle-speed pulse may not be input to the controller 140 in the first place.

The portable device 10 is now described. The portable device 10 includes the display unit 11, the operation unit 12, the GPS information receiving unit 13, the speaker 14, a storage cell 15, a cell charging circuit 16, a wireless communication transmitting/receiving unit 17, a memory 18, the navigating unit 19, the controller 20, and the connector 30.

The functions of each of the components are now described in detail.

The display unit 11 includes a liquid crystal panel and a backlight. The display unit 11 can display map information or destination guide route information that is generated by the navigating unit 19, or the received broadcasting frequency, the reproduced tune track No., the reproduced tune title, or the like that is transferred from the in-vehicle device 100. Each of the display units 11 and 131 may not be formed with a liquid crystal panel, but may be formed with some other flat panel display such as an organic EL display panel, a plasma display panel, or a cold-cathode flat display panel.

The operation unit 12 includes a touch panel and a power switch button 55 (see FIG. 7A) for switching on and off the power source of the portable device 10. The touch panel may be placed on the display screen of the display unit 11, for example. When the touch panel is touched with a finger or a special-purpose pen, the touched point is spotted, and an input operation is detected. The power switch button 55 will be described later.

The GPS information receiving unit 13 includes an antenna and a tuner unit, and receives GPS signals from satellites. Each received GPS signal is output to the navigating unit 19, and the location of the device is determined from the GPS signal. The in-vehicle device 100 also has the GPS information receiving unit 133 mounted thereon. When the portable device 10 is attached to the in-vehicle device 100, the location of the vehicle on which the in-vehicle device 100 accommodating the portable device 10 is mounted is determined from a GPS signal (and a vehicle speed pulse) received by the GPS information receiving unit 133. When the portable device 10 is used independently of the in-vehicle device 100, the location of the portable device 10 is determined from a GPS signal received by the GPS information receiving unit 13.

The speaker 14 is designed to output audio information that is supplied from the navigating unit 19. When the portable device 10 is detached from the in-vehicle device 100 or is used independently of the in-vehicle device 100, the speaker 14 outputs audio information.

The storage cell 15 supplies electric power to each component of the portable device 10. When the portable device 10 is attached to the in-vehicle device 100, electric power is supplied from the battery of the vehicle via the power supply terminal of the connector 30, and the storage cell 15 is charged by the charging circuit 16. The charging circuit 16 receives electric power from a connected terminal via a USB slot 57 (see FIG. 7A), and then charges the storage cell 15.

The wireless communication transmitting/receiving unit 17 exchanges communication voices with a portable telephone device, and obtains information to be used for navigations via a portable telephone device. The wireless communication transmitting/receiving unit 17 may utilize Bluetooth, which is a 2.4-GHz band wireless transmission method.

The memory 18 may be a RAM on which reading and writing can be performed. Information that is read for each controlling operation is temporarily stored in the memory 18.

The navigating unit 19 includes a map information storage unit that obtains and stores map information from a SD card or a USB memory (described later) that stores the map information to be used for navigations. In accordance with a GPS signal supplied from the GPS information receiving unit 133 or 13, the navigating unit 19 detects the current location information, and creates an image to be used in a navigating operation. The created map can be displayed on the display unit 11. When the portable device 10 is connected to the in-vehicle device 100, the vehicle speed pulse is obtained from the vehicle, so as to increase the accuracy of determining the location of the vehicle on which the in-vehicle device 100 accommodating the portable device 10 is mounted. Alternatively, the map information may be stored in the portable device 10.

The controller 20 controls each of the components of the portable device 10. The controller 20 also outputs various signals to the in-vehicle device 100 via the connector 30, and, based on various signals that are input from the in-vehicle device 100, controls the portable device 10. For example, the controller 20 obtains a GPS signal and a vehicle speed pulse received by the GPS information receiving unit 133 of the in-vehicle device 100, from the controller 140 of the in-vehicle device 100. The controller 20 then outputs the GPS signal and the vehicle speed pulse to the navigating unit 19.

The controller 20 also obtains an audio signal that is input through the microphone 138 of the in-vehicle device 100, from the controller 140 of the in-vehicle device 100. In accordance with the audio signal, the controller 20 controls the navigating unit 19. Accordingly, the navigating unit 19 can be operated in a handsfree fashion. The controller 20 also outputs communication voices from a portable telephone device connected to the wireless communication transmitting/receiving unit 17, to the in-vehicle device 100 via the connector 30, so that the communication voices can be output from the speaker 145 of the in-vehicle device 100. The controller 20 also outputs an operation signal for a menu screen or a content screen displayed on the display unit 11, to the controller 140 of the in-vehicle device 100 via the connector 30. In accordance with the operation signal transmitted from the controller 20 of the portable device 10, the controller 140 controls the radio receiving unit 134 and the reproducing unit 135.

Figure 7A:
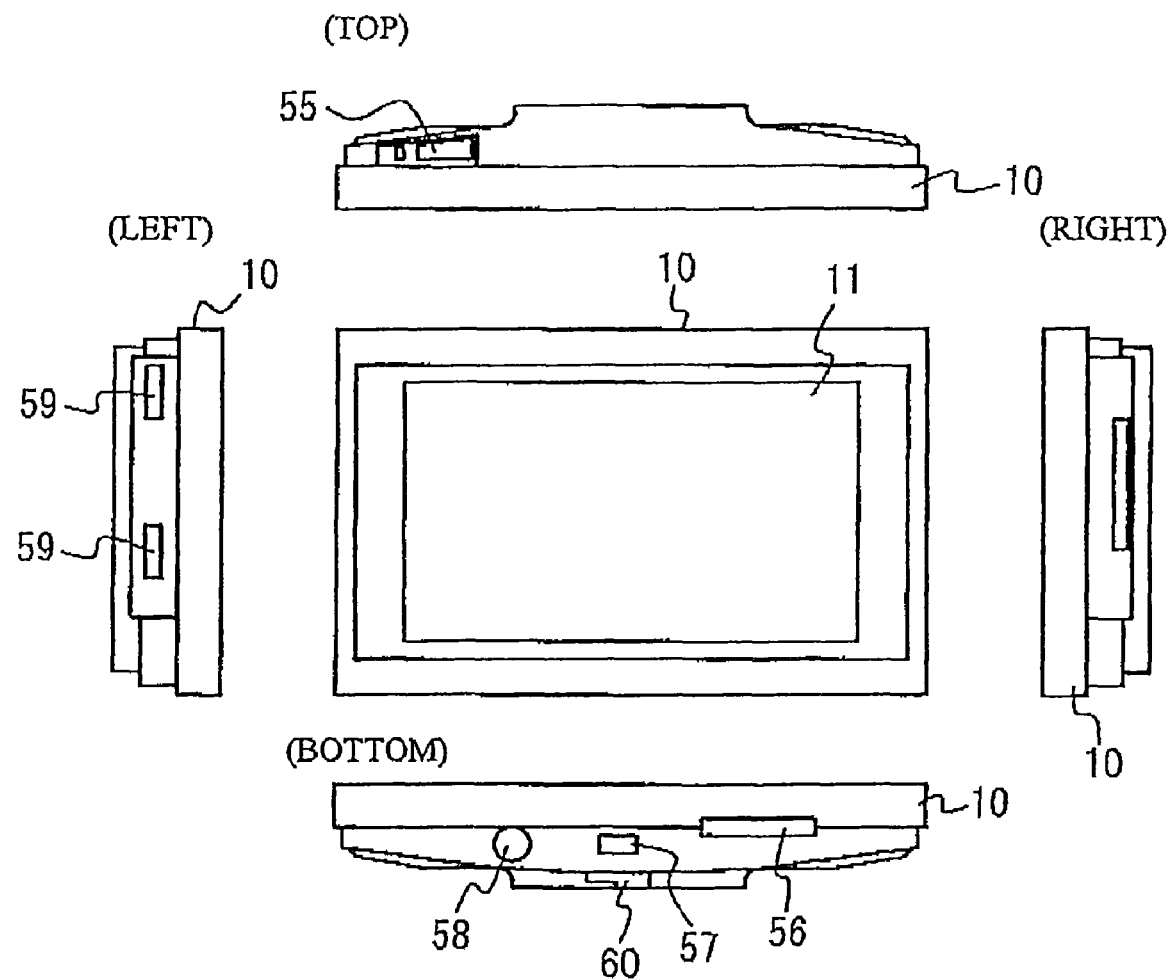
FIG. 7A illustrate front, top, bottom, left side and right-side views of the portable device.
Figure 7B:
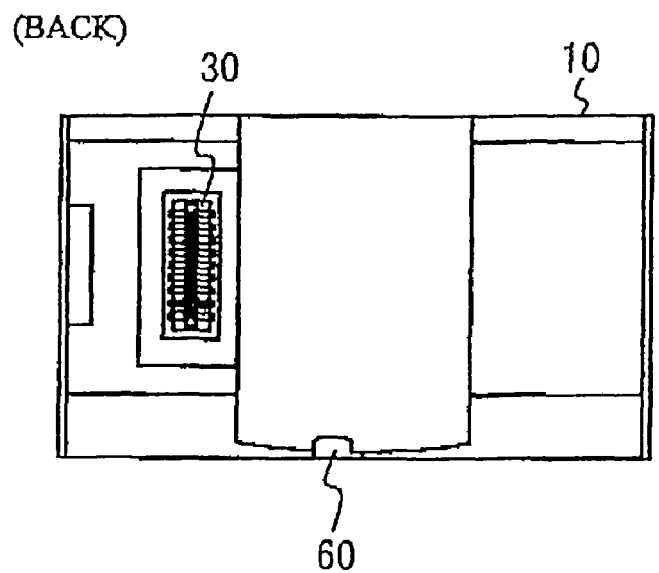
FIG. 7B is a back view of the portable device.

FIG. 7A illustrates a front view, a top view, a bottom view, a left side view, and a right side view of the portable device 10. FIG. 10B illustrates a back view of the portable device 10.

The power switch button 55 for switching on and off the power source of the portable device 10 is provided on the top face of the portable device 10. A SD (Secure Digital) memory card slot 56, a USB slot 57, and an earphone jack 58 are formed in the bottom face of the portable device 10. Recesses 59 for accommodating the ribs 162 illustrated in FIG. 2 are provided on the left side of the portable device 10. A connector 30 for making electrical connections with the in-vehicle device 100 is provided on the backside of the portable device 10. Further, an engagement groove 60 for engagement with the eject unit 164 is provided on the bottom and back surfaces of the portable device 10.

A SD card or a USB memory having map information recorded thereon is inserted to the SD memory card slot 56 or the USB slot 57, so that the controller 20 can read the map information from the SD card or the USB memory, and output the map information to the navigating unit 19.

When the portable device 10 is attached to the in-vehicle device 100, the power source of the portable device 10 is switched on and off under the control of the in-vehicle device 100.

Figure 8:
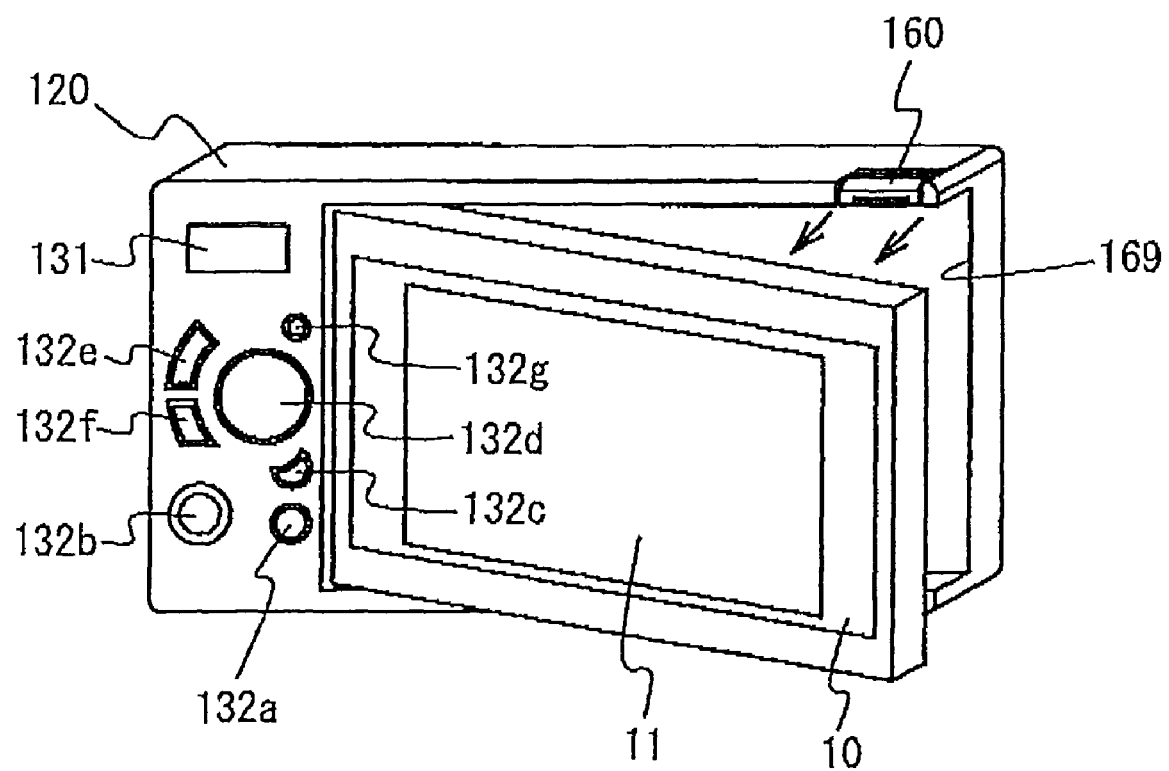
FIG. 8 illustrates the portable device pushed out from an accommodation section of the front-face unit.

A description will now be given of a way to attach and detach the portable device 10 to and from the accommodation section 170. When the detachment button 160 is depressed in the state in which the portable device 10 has been attached, the locked state implemented by the lock 161 is released and the eject unit 164 pushes the back surface of the portable device 10, which is thus ejected forwards from the accommodation section 170. Since the ribs 162 are engaged with the recesses 59 in the above ejecting operation, the right side of the portable device 10 is ejected from the accommodation section 170 while the left side of the portable device 10 is still accommodated. More specifically, the portable device 10 is ejected from the accommodation section 170 so that the right side thereof is turned about the axis defined by the left side. FIG. 8 illustrates the portable device 10 ejected from the accommodation section 170. As illustrated in FIG. 8, the side of the portable device 10 located on the side of the front-face unit 120 having the opening 169 is ejected forwards. The recesses 59 and the ribs 162 form a guide mechanism.

As illustrated in FIGS. 1 and 2, the accommodation section 170 has the opening 169 that allows the right side of the portable device 10 to be exposed. This arrangement of the opening 169 is realized by placing the eject unit 164 behind the accommodation section 170. In related art, the eject unit may be arranged within a sidewall located in the opening 169. In contrast, according to the present in-vehicle device 100, the unique arrangement of the eject unit 164 behind the accommodation section 170 makes it possible to omit the sidewall and instead arrange the opening 169.

If the portable device is attached in such a way that the entire sides of the portable device are covered by the accommodation section, it may be difficult to accommodate the portable device having a greater size in the planar dimension in the accommodation section. In addition, the above way may cause a greater size of the in-vehicle device. Furthermore, the presence of the display unit 131 and the operation unit 132 on the front-face unit 120 limits the space for accommodating the portable device. In contrast, the present embodiment is capable of accommodating the portable device 10 having a greater size in planar dimension because the eject unit 164 is provided behind the accommodation section 170, and the opening 169 is formed in the side of the accommodation section 170. The portable device 10 having a greater size in planar dimension may have the display unit 11 having a greater screen size, which improves the visibility of the display unit 11.

The opening 169 is provided on the right side of the front-face unit 120 on which the portable device 10 is ejected or pushed out from the accommodation section 170. Thus, the user can easily hold the right side of the portable device 10 that has been ejected from the accommodation section 170. It is thus possible to easily remove the portable device 10 from the in-vehicle device 100. In the state illustrated in FIG. 8, the portable device 10 is detachably supported by the eject unit 164, as will be described in detail later.

The eject unit 164 is now described in detail.

Figure 9:
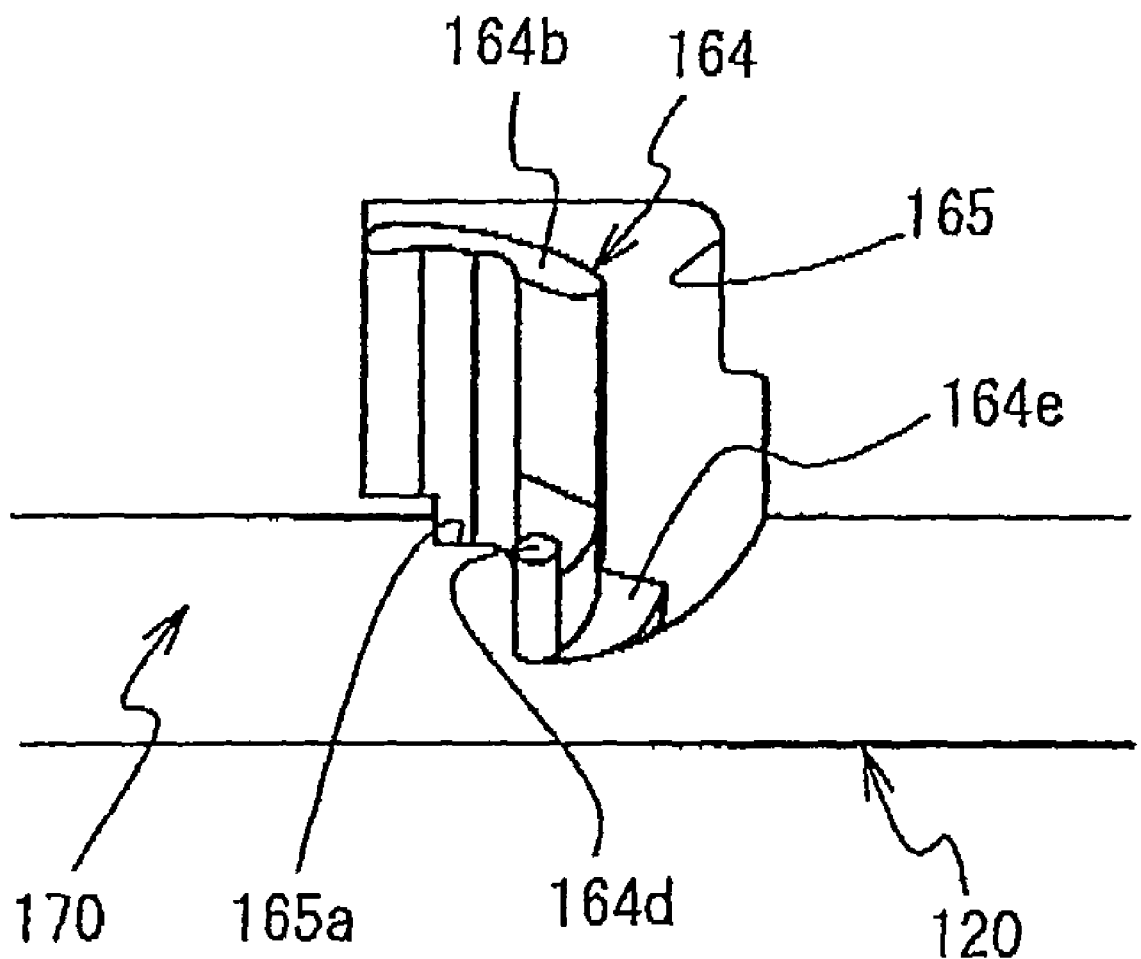
FIG. 9 is a perspective view of an eject unit.
Figure 10:
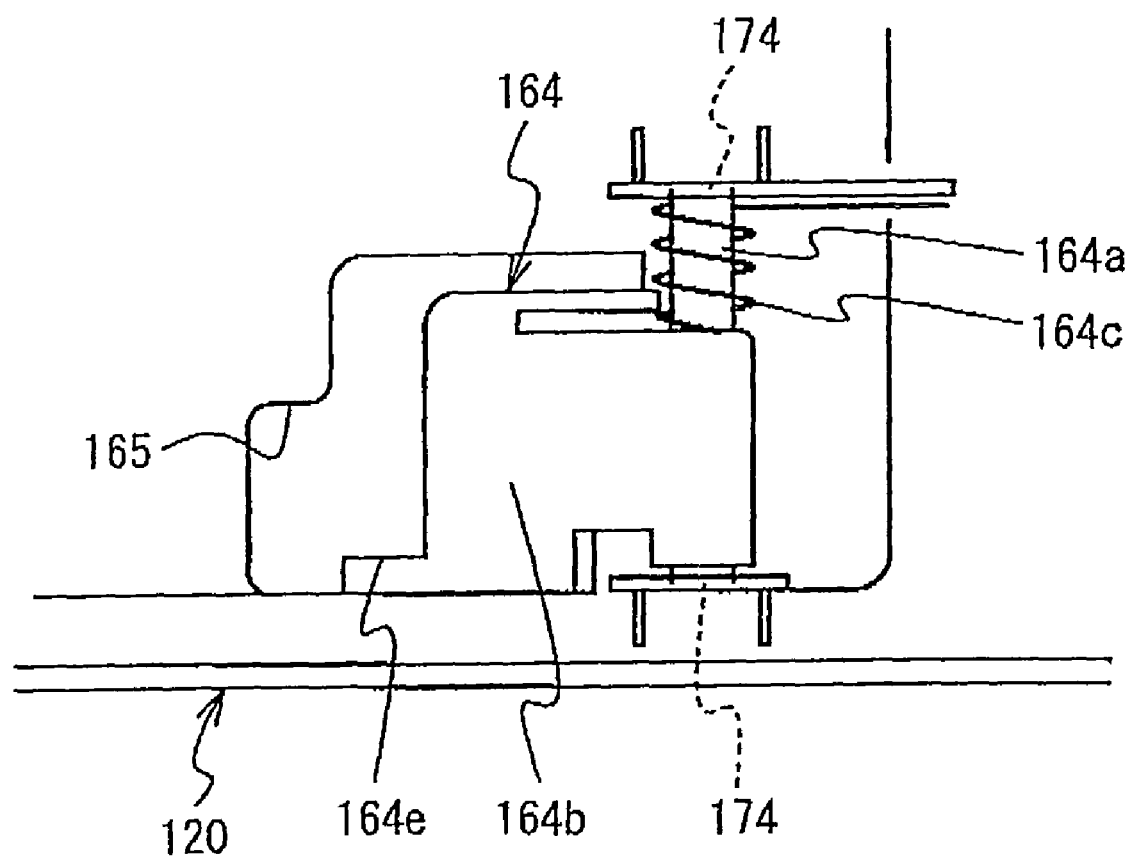
FIG. 10 illustrates the eject unit viewed from the backside of the front-face unit.
Figure 11:
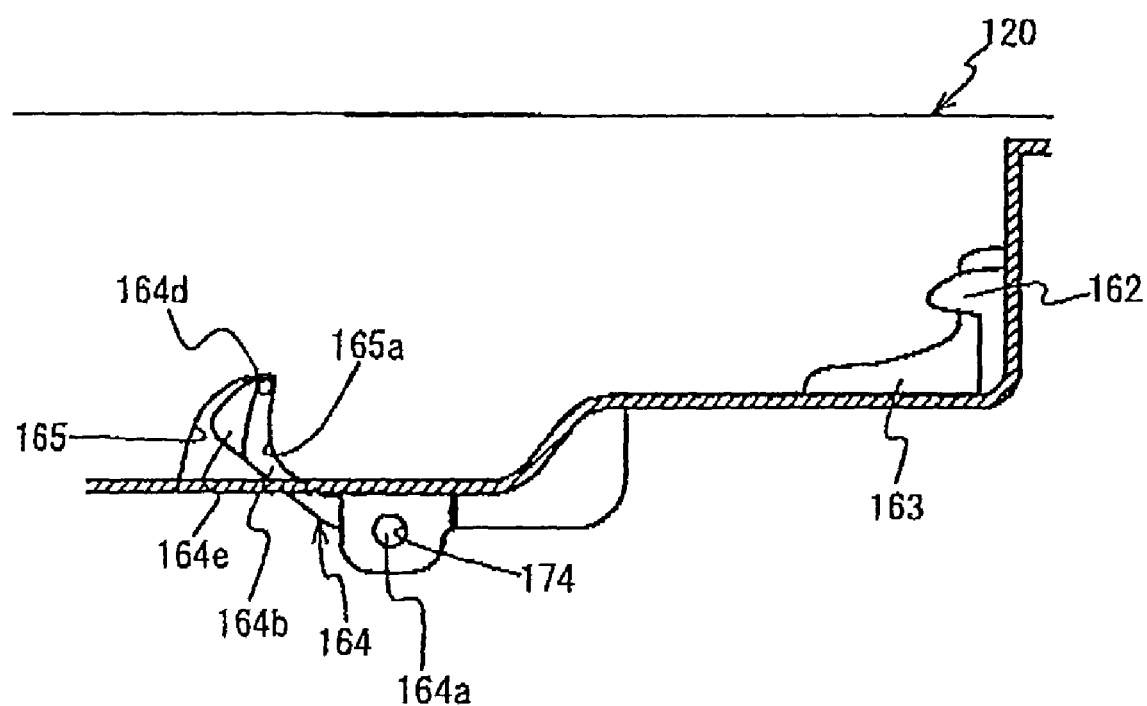
FIG. 11 is a cutaway cross-sectional view of the front-face unit.

FIG. 9 is a perspective view of the eject unit 164, FIG. 10 illustrates the eject unit 164 viewed from the backside of the front-face unit 120, and FIG. 11 is a cutaway cross-sectional view of a part of the front-face unit 120. FIG. 11 illustrates a state in which the portable device 10 has been removed from the accommodation section 170. As illustrated in FIGS. 9 and 10, the eject unit 164 is composed of a shaft 164a, an arm 164b, a spring 164c, a support pin 164d, and a cover portion 164e.

The eject unit 164 is arranged behind the accommodation section 170. The shaft 164a is rotatably supported by a shaft hole 174 behind the accommodation section 170. The arm 164b extends from the shaft 164a outwards in the radial direction. The spring 164c is an urging member and is wound around the shaft 164a. The spring 164c functions to cause the arm 164b to eject or push out the portable device 10 attached to the accommodation section 170. The support pin 164d is formed at a tip end of the arm 164b. The arm 164b may be a support member that detachably supports the portable device 10 in the state illustrated in FIG. 8, as will be described in detail later. The cover portion 164e is provided on the bottom side of the arm 164b and is formed into a thin plate shape.

The escape vent 165 has an edge 165a, which is brought into contact with the arm 164b in a state in which the portable device 10 has been removed. The edge 165a is formed so as to have a contour formed along the outer shape of the arm 164b. Due to the function of the spring 164c, the arm 164b is pushed against the shaft 164a. When the arm 164b is brought into contact with the edge 165b, the turn of the arm 164b is limited.

Figure 12A:
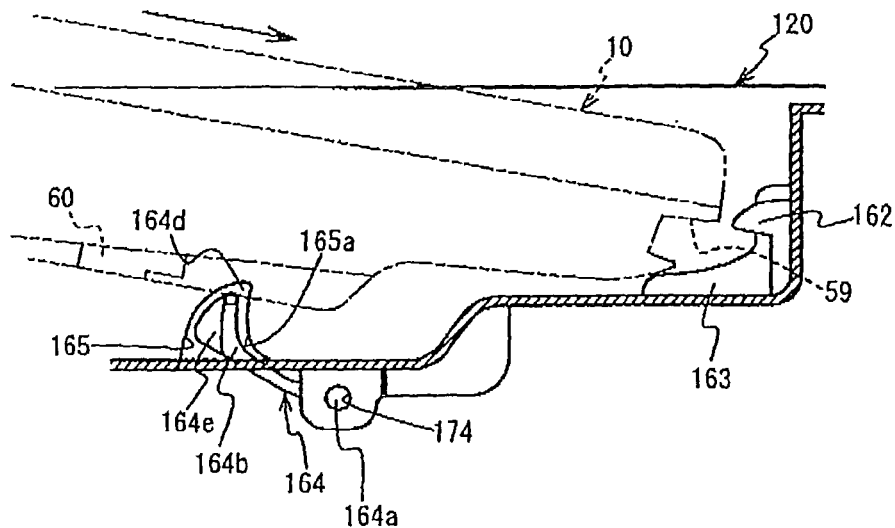
FIGS. 12A through 12C are respectively cutaway cross-sectional views illustrating a way to attach and detach the portable device to and from the in-vehicle device.
Figure 12B:
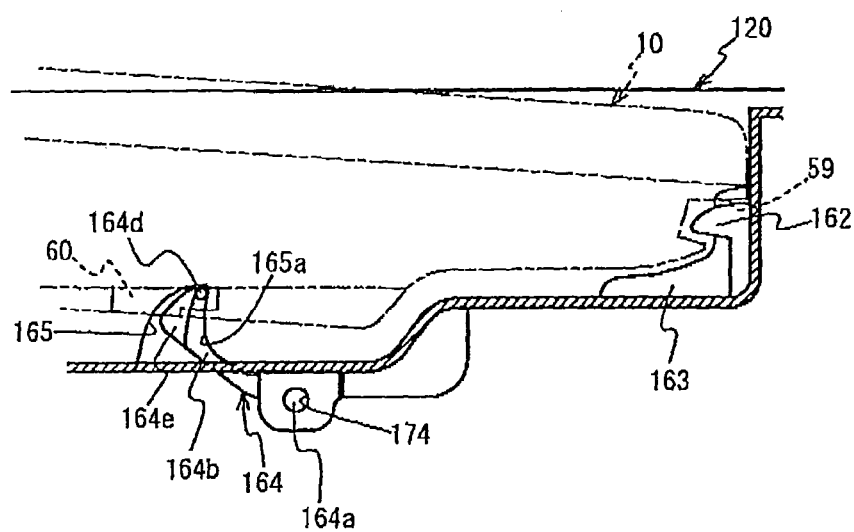
Figure 12C:
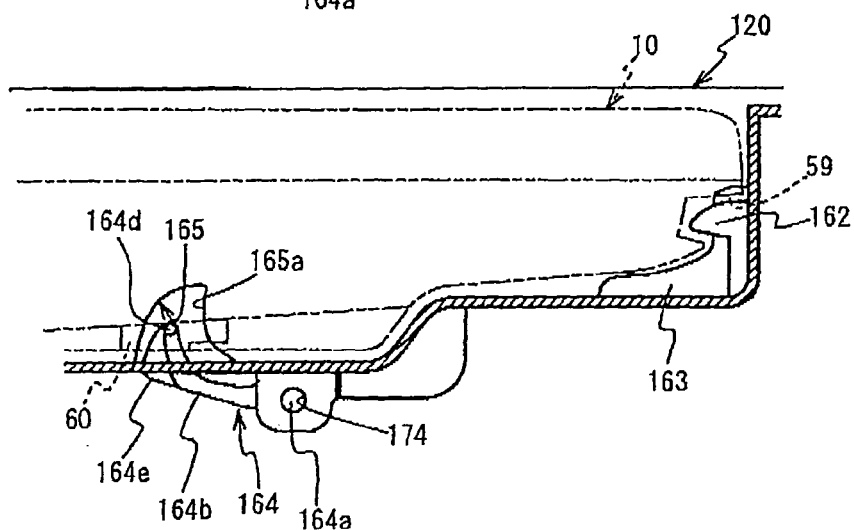

A description will be given of a way to attach and detach the portable device 10 to and from the in-vehicle device 100. FIGS. 12A through 12C are respectively cutaway cross-sectional views of parts of the portable device 10 and the in-vehicle device 100. FIG. 12A illustrates a way to attach the portable device 10 to the in-vehicle device 100. Referring to FIG. 12A, the portable device 10 is inserted in a direction depicted in a state in which the portable device 10 is tilted to the accommodation section 170 in order to engage the ribs 162 located at the left side of the accommodation section 170 with the recesses 59 formed on the corresponding side of the portable device 10. In the state illustrated in FIG. 12A, the back surface of the portable device 10 is pressed against the support pin 164d over the urging force of the spring 164c.

When the portable device 10 is inserted into the direction indicated by the arrow depicted in FIG. 12A, the ribs 162 are engaged with the recesses 59, and the support pin 164d is engaged with the engagement groove 60, as depicted in FIG. 12B. The engagement of the support pin 164d with the engagement groove 60 supports the portable device 10 in the state illustrated in FIG. 12B.

The slopes 163 contact the back surface of the portable device 10 and guide the portable device 10 to a position where the ribs 162 are engaged with the recesses 59. In this position, the portable device 10 is attached to the accommodation section 170. That is, the slopes 163 correspond to a guide that guides the portable device 10 to the attachment position. With this structure, the portable device 10 can easily be loaded.

The portable device 10 is plugged in the accommodation section 170 from the state depicted in FIG. 12B, the lock 161 locks the portable device 10, so that the portable device 10 can be attached to the accommodation section 170, as illustrated in FIG. 12C.

The portable device 10 may be removed from the accommodation section 170 as follows. The detachment button 160 is depressed, and the lock 161 disengages the locked state. The eject unit 164 urges the portable device 10 forwards from the backside thereof. Thus, part of the portable device 10 is ejected from the accommodation section 170 with the ribs 162 being engaged with the recesses 59. That is, the portable device 10 is ejected from the accommodation section 170 in the state illustrated in FIGS. 8 and 12B.

The portable device 10 ejected from the accommodation section 170 is supported in the state illustrated in FIG. 12B in which the support pin 164d is engaged with the engagement groove 60. The engagement of the support pin 164d with the engagement groove 60 is maintained due to the weight of the portable device 10. The user slightly lifts up the portable device 10 supported by the support pin 164d forwards, so that the support pin 164d can be disengaged from the engagement groove 60 and the portable device 10 can be removed.

The portable device 10 can be attached to and detached from the in-vehicle device 100 in the manner described above. The eject unit 164 pushes the center portion of the portable device 10 between the left and right sides. If the eject unit 164 pushes a portion of the portable device 10 close to the right side thereof on which the portable device 10 is ejected, an increased stroke will be needed to eject the portable device 10 may be increased. The increased stroke increases the side of the eject unit. In contrast, the present embodiment is designed to push the center portion of the portable device 10, so that the portable device 10 can be ejected by a reduced stroke and the downsizing can be realized.

The eject unit 164 may be arranged on the left side of the accommodation section 170. In this arrangement, the portable device 10 is turned about the left side thereof, and only a reduced stroke is needed to push out the portable device 10. However, the above arrangement needs increased force necessary to eject the portable device 10. Therefore, there is a need to employ a spring having greater spring force. However, when greater spring force is applied to the eject unit 164, the eject unit 164 has increased load and may be damaged. In addition, it may be difficult to arrange the spring having greater spring force in a space available on the left side of the accommodation section 170 because of the presence of the operation unit 132 arranged on the left side. In contrast, the in-vehicle device 100 of the present embodiment does not have the above problems because the eject unit 164 is arranged behind the accommodation section 170.

As has been described, the portable device 10 is detachably supported by the engagement of the support pin 164d with the engagement groove 60 when the portable device 10 is ejected by the eject unit 164. The engagement groove 60 is arranged close to the bottom surface of the portable device 10 and is located at the center portion between the left and right sides of the portable device 10. Thus, the portable device 10 is supported at the center portion close to the bottom. The portable device 10 is supported at a position close to the center of gravity, so that supporting can be reliable. The center position close to the bottom means that the above center position is closer to the bottom than the right, left and upper surfaces of the portable device 10.

As illustrated in FIG. 11, the cover portion 164e covers a part of the escape vent 165 in the state in which the portable device 10 is removed from the in-vehicle device 100. It is thus possible to prevent a finger of the user from being caught between the escape vent 165 and the eject unit 164.

As illustrated in FIG. 11, the edge 165a is formed so that the contour is shaped along the side surface of the arm 164b. The edge 165a is useful in a case where the left side of the portable device 10 contacts the eject unit 164 and force is exerted on the eject unit 164 rightwards in FIG. 11 when the portable device 10 is attached to the accommodation section 170. In this case, the force applied to the eject unit 164 is distributed by the edge 165a, concentration of load on the shaft 164a can be prevented. It is thus possible to prevent the eject unit 164 from being damaged.

The slopes 163 guide the portable device 10 to the attachment position. The slopes 163 are provided taking the following into consideration. There is a trend to thin the portable device 10. Thus, the side surface of the portable device 10 is reduced. In the absence of the slopes 163, there may be a difficulty in engagement between the recesses 59 formed on the left side of the portable device 10 and the ribs 162. The slopes 163 make it possible to easily attach the thinned portable device 10 the in-vehicle device 100.

As illustrated in FIG. 11, the ribs 162 are shaped so as to become thinner towards the ends from the root sides. It is thus possible to facilitate engagement of the ribs 162 with the recesses 59. The tip ends of the ribs 162 are rounded. It is thus possible to prevent the portable device 10 from being bruised and to prevent the ribs 162 from being damaged, if the ends of the ribs 162 touch the right surface of the portable device 10 at the time of attaching the portable device 10 to the accommodation section 170.

Figure 13A:
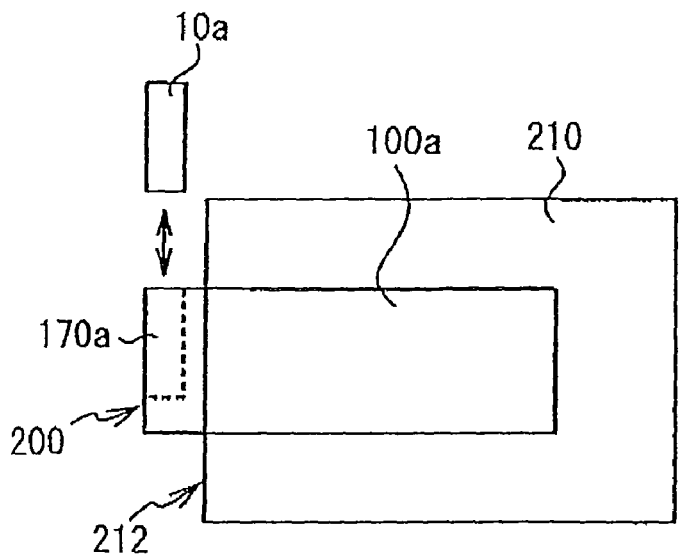
FIGS. 13A through 13C illustrate related art.

If the in-vehicle device described in Reference 6 is attached to a vehicle, as illustrated in FIG. 13A, a portable device 10a is attached to and removed from an accommodation section 170a for accommodating the portable device by causing the accommodation section 170a to protrude from a front surface 212 of a console of the vehicle and causing the portable device 10a to vertically slide in the accommodation section 170a. During the attachment or detachment, the portable device 10a may hit a discharge port of an air conditioner located in an upper portion of an in-vehicle device 100a, and the attachment/detachment work may not be carried out smoothly. Further, the user may happen to touch the in-vehicle device 100a during the operation of the vehicle because a front surface 200 of the portable device 10a protrudes from the front surface 212. The protruding portable device 10a reduces the space in the vehicle.

Figure 13B:
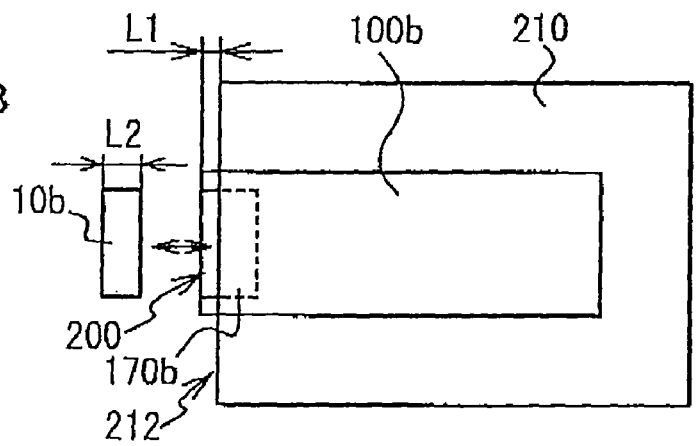
Figure 13C:
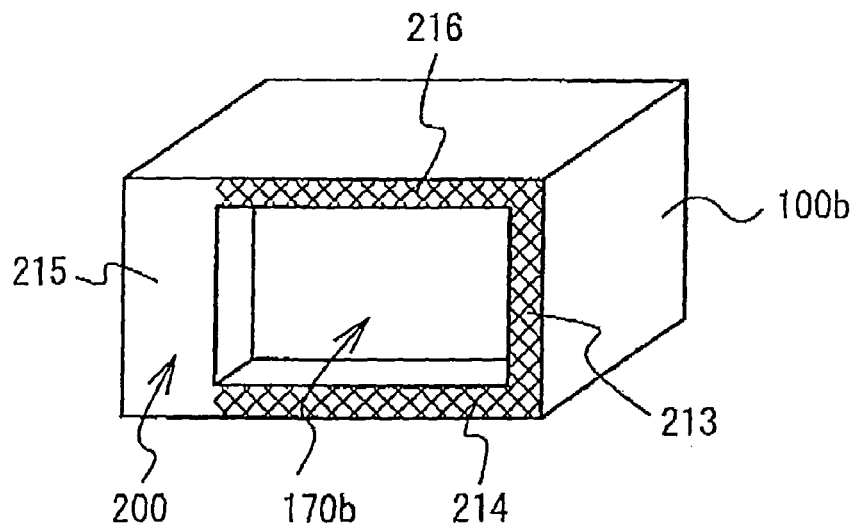

With the above in mind, it is conceivable to reduce a protrusion length L1 between the front surface 212 of the in-vehicle device 100b and the front surface 212 of the console 210. However, if the protrusion length L1 is less than the width L2 of the portable device 10b, it may be difficult to cause the portable device 10b to slide upwards from the accommodation section 170b for removal. With the above in mind, as illustrated in FIG. 13C, the accommodation section 170b having the recess is provided on the front surface 200. The portable device 10b is ejected forwards from the accommodation section 170b, as illustrated in FIG. 13B. If the portable device 10b is not ejected greatly, it may be difficult for the user to hold the portable device 10b and remove it easily. If the portable device 10b is modified so as to be ejected greatly, a greater mechanism may be required to realize the great ejection.

In the structure illustrated in FIG. 13C, the accommodation section 170b has four sidewalls 213 through 216 to define the recess. Thus, only a small area on the front surface 200 is available for providing the operation unit for the in-vehicle device 100b. The front surface 200 is not great because the in-vehicle device 100b is installed in the console of the vehicle having a limited area.

Figure 14A:
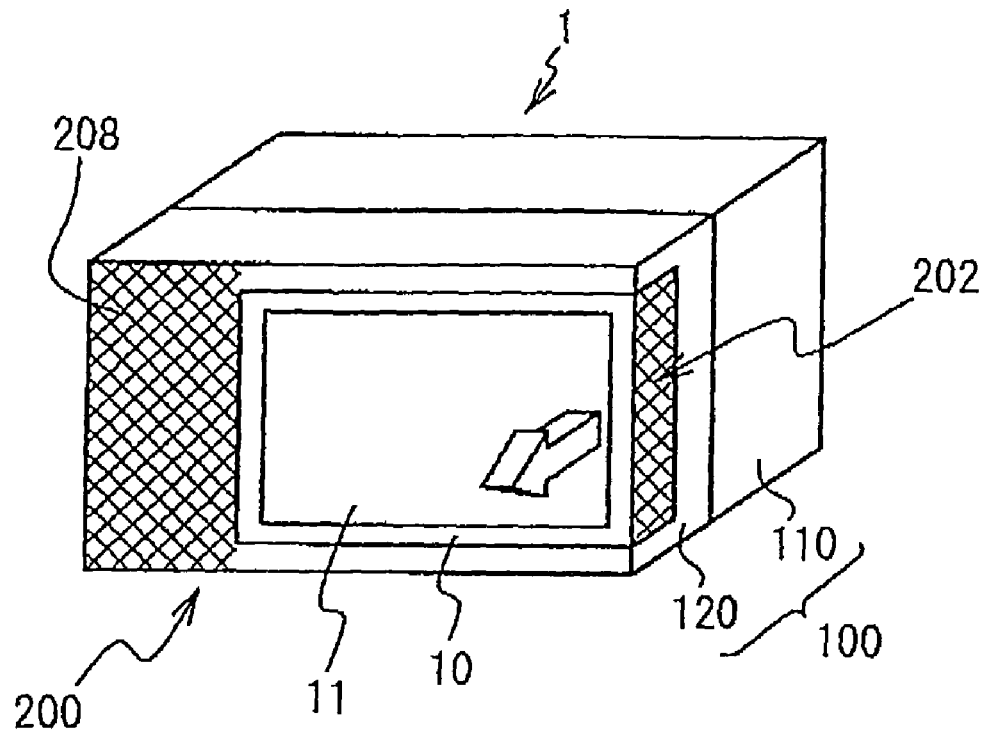
FIG. 14A is a perspective view of the in-vehicle device to which the portable device is attached, and FIG. 14B schematically illustrates the portable device.
Figure 14B:
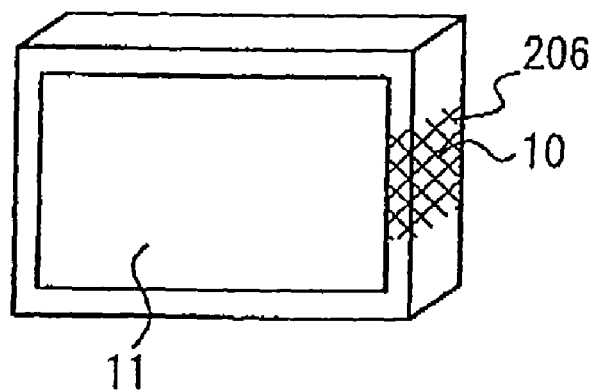

FIG. 14A schematically illustrates the in-vehicle device 100 in which the portable device 10 is accommodated, and FIG. 14B schematically illustrates the portable device 10. Referring to FIG. 14A, according to the first embodiment, the accommodation section 170 (see FIG. 2) for detachably accommodating the portable device 10 has the recess having the opening on the right side. The recess is provided on the front surface of the front-face unit 120, and accommodates the portable device 10 detachably. The front-face unit 120 has the opening 169 through which the right side of the portable device 10 viewed from the front of the front-face unit 120 is exposed in the state in which the portable device 10 is accommodated in the recess. With this structure, it is possible for the use to easily hold the right side (a region 206 in FIG. 14B) of the portable device 10 exposed through the opening 169 and to thus remove the portable device 10 easily.

Referring to FIG. 14A, the accommodation section 170 does not have the wall on the right side in contrast to the sidewall 213 illustrated in FIG. 13C. It is thus possible to arrange the accommodation section 170 on the right side of the in-vehicle device 100 and to efficiently utilize an area 208 on the left side of the accommodation section 170. When the portable device 10 is horizontally long, the accommodation section 170 illustrated in FIG. 13C reduces the area 208. It can be seen from the above that the opening 169 brings about the particular advantages.

The opening 169 may be provided on the left side of the accommodation section 170 viewed from the front thereof. When the portable device 10 is held by the right hand, it is preferable that the opening 169 is provided on the right side of the accommodation section 170 viewed from the front thereof.

Referring to FIG. 8, the right side of the portable device 10 is ejected from the accommodation section 170 (see FIG. 2). Thus, the user is capable of easily holding the right side of the portable device 10. When the eject unit 164 (see FIG. 9) ejects the portable device 10, the part of the portable device 10 on the side of the opening 169 is pushed forwards. Thus, the distance between the front-face unit 120 and the portable device 10 can be increased, and the portable device 10 can be held more easily. The presence of the opening 169 makes it possible for the user to hold the portable device 10 easily even when the portable device 10 is not ejected greatly. Thus, the eject unit 164 can be downsized.

Second Embodiment

Figure 15:
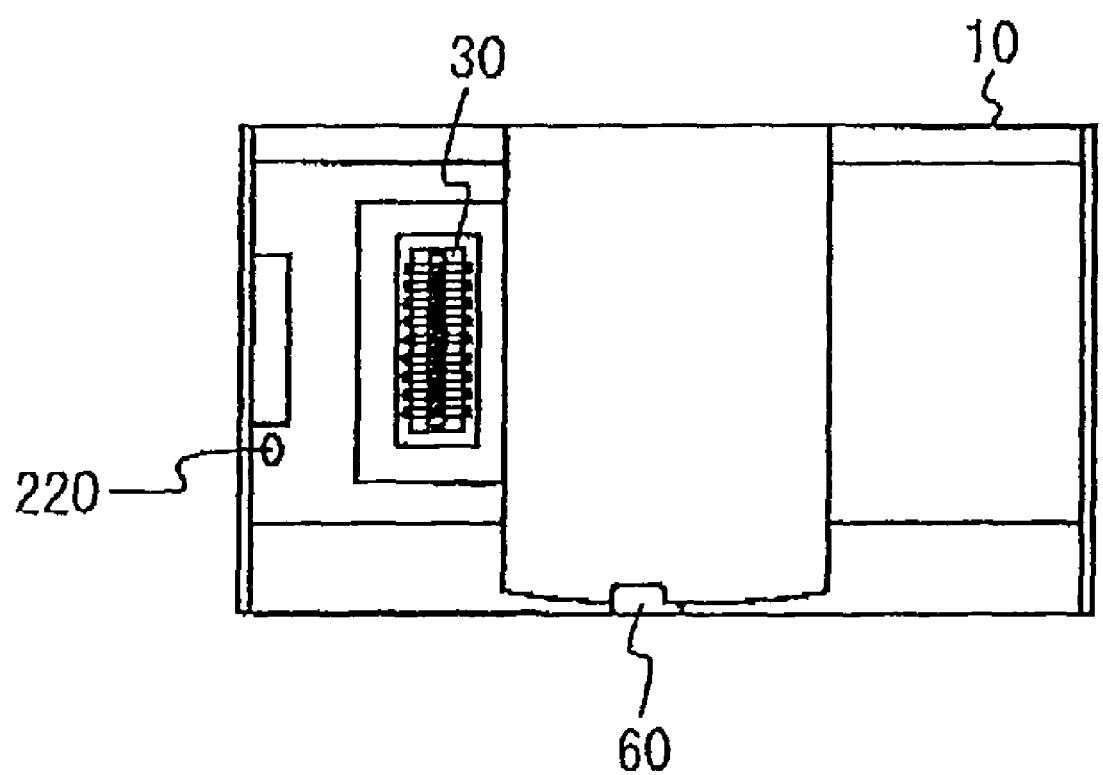
FIG. 15 is a back view of a portable device in accordance with a second embodiment.

A second embodiment includes a portable device having a strap hole. FIG. 15 is a back view of the portable device in accordance with the second embodiment. The portable device 10 has a strap hole 220 on a side surface. The strap hole 220 is used to engage a rope or wire with the portable device 10. The portable device 10 is connected to the in-vehicle device 100 by the rope or wire engaged with the strap hole 220, so that an antitheft mechanism can be realized easily.

Figure 16:
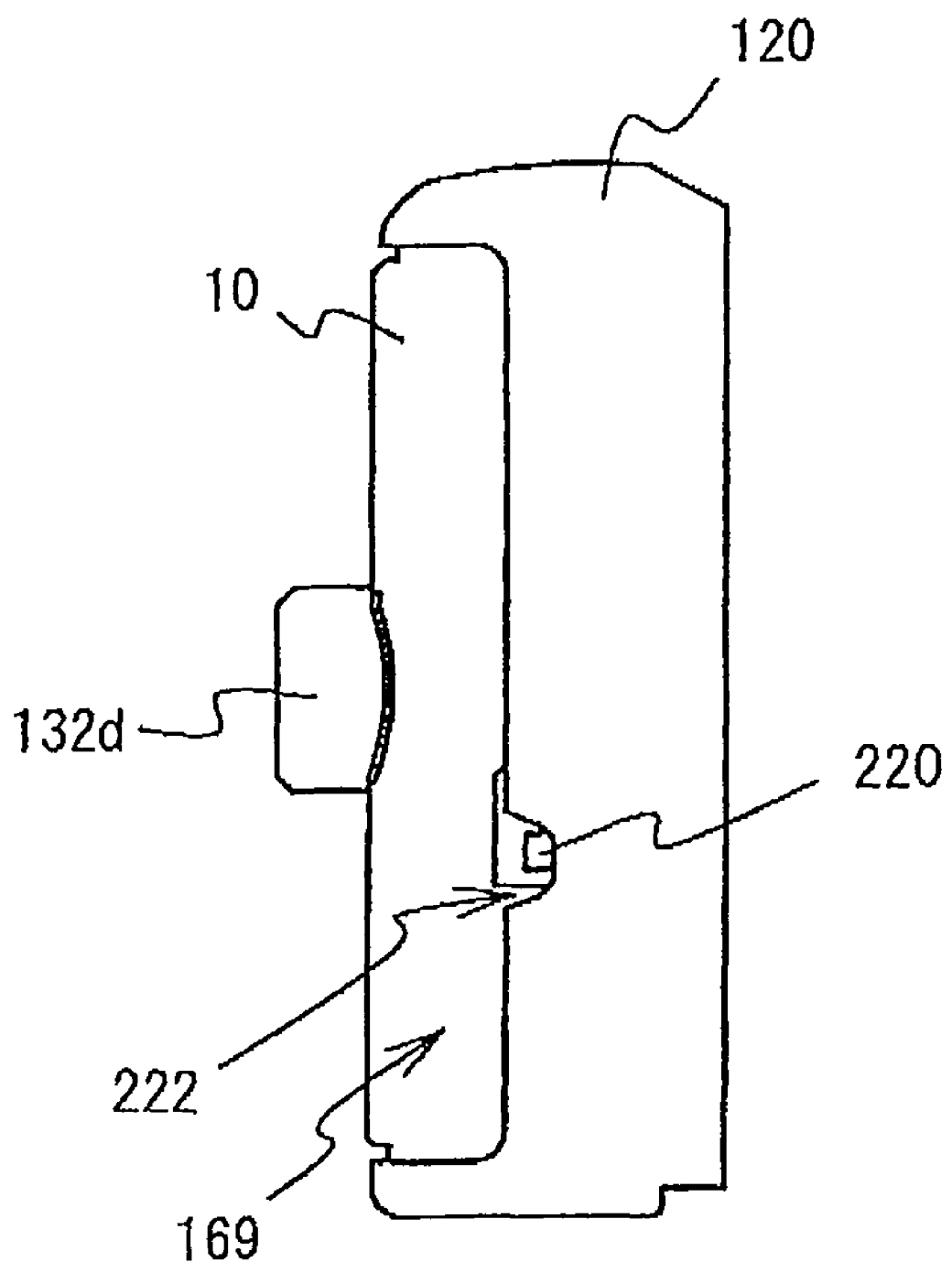
FIG. 16 is a side view of the front-face unit to which the portable device is attached.

FIG. 16 is a side view of the portable device 10 accommodated in the front-face unit 120. The opening 169 has a dent 222 for exposing the strap hole 220. The strap hole 220 is exposed through the dent 222 in the state in which the portable device is accommodated in the accommodation section. It is thus possible to easily draw the rope or wire engaged with the strap hole 220 through the opening 169.

In the first and second embodiments, the front-face unit 120 covers the main unit 110 in the state in which the front-face unit 120 stands vertically and faces the front surface of the main unit 110, as illustrated in FIG. 14A. As illustrated in FIG. 3, the front surface of the main unit 110 is exposed in the state in which the front-face unit 120 is inclined by causing the lower portion of the front-face unit 120 to slide forwards. Thus, the front-face unit 120 is movable. The front-face unit 120 is movably supported by the main unit 110 by the slider 181. The first and second embodiments may be varied so that the front-face unit 120 is not movable but is provided to the front of the in-vehicle device 100 in the stationary fashion.

The portable devices used in the first and second embodiments may be portable navigation devices and other types of portable devices that can be detachably accommodated in the accommodation section 170. The recent portable navigation devices are required to have a greater size of the display unit 11, which needs a greater size of the accommodation section 170. The present invention is particularly advantageous to the recent portable navigation devices.

The present invention is not limited to the specifically disclosed embodiments and variations, but other embodiments and variations may be made without departing from the scope of the present invention.

The present invention is based on Japanese Patent Application No. 2008-102866 filed on Apr. 10, 2008 and Japanese Patent Application No. 2008-134878 filed on May 23, 2008, the entire disclosure of which is hereby incorporated by reference.

What is claimed is:

1. An electronic device comprising:
an accommodation section that detachably accommodates a portable device;
an eject unit that ejects the portable device accommodated in the accommodation section; and
a guide mechanism that guides the portable device so that a first side of the portable device is positioned in the accommodation section and a second side thereof opposite to the first side is ejected from the accommodation section,
the eject unit being arranged behind the accommodation section, and
the accommodation section having an opening through which the second side of the portable device accommodated in the accommodation section is exposed.

2. The electronic device as claimed in claim 1, wherein the eject unit pushes a center portion of the portable device between the first and second sides thereof.

3. The electronic device as claimed in claim 1, wherein the eject unit includes a support member that detachably supports the portable device in a state in which the first side of the portable device is positioned in the accommodation section and the second side thereof is ejected from the accommodation section.

4. The electronic device as claimed in claim 3, wherein the support member supports a bottom of the portable device.

5. The electronic device as claimed in claim 1, wherein the accommodation section has an escape vent for escaping the eject unit.

6. The electronic device as claimed in claim 5, wherein the eject unit includes a cover member that covers the escape vent in a state in which the portable device is removed from the accommodation section.

7. The electronic device as claimed in claim 1, wherein the eject unit includes a shaft rotatably supported, an arm extending from the shaft outwards in a radial direction, and an urging member that causes the arm to eject the portable device.

8. The electronic device as claimed in claim 5, wherein the escape vent has a shape formed along an outer shape of the arm so that the escape vent is brought into contact with the arm in a state in which the portable device is removed from the accommodation section.

9. An electronic system comprising a portable device, and an electronic device that detachable holds the portable device,
the electronic device comprising:
an accommodation section that detachably accommodates the portable device;
an eject unit that ejects the portable device accommodated in the accommodation section; and
a guide mechanism that guides the portable device so that a first side of the portable device is positioned in the accommodation section and a second side thereof opposite to the first side is ejected from the accommodation section,
the eject unit being arranged behind the accommodation section, and
the accommodation section having an opening through which the second side of the portable device accommodated in the accommodation section is exposed.

10. The electronic system as claimed in claim 9, wherein the portable device is a navigation device.

11. An in-vehicle electronic device comprising:
a main unit; and
a front-face unit provided on a front side of the main unit,
the front-face unit including an accommodation section having a recess for detachably accommodating a portable device,
the accommodation section having an opening through which one of right and left sides of the portable device is exposed in a state in which the portable device is accommodated in the accommodation section.

12. The in-vehicle electronic device as claimed in claim 11, further comprising an eject unit that ejects a side of the portable device on which the opening is formed.

13. The in-vehicle electronic device as claimed in claim 11, wherein the portable device has a strap hole on a side, and the strap hole is exposed through the opening in a state in which the portable device is accommodated in the recess.

14. The in-vehicle electronic device as claimed in claim 11, wherein the portable device is a portable navigation device.

15. An in-vehicle electronic system comprising a portable device and an in-vehicle electronic device,
the in-vehicle electronic device comprising:
a main unit; and
a front-face unit provided on a front side of the main unit,
the front-face unit including an accommodation section having a recess for detachably accommodating the portable device,
the accommodation section having an opening through which one of right and left sides of the portable device is exposed in a state in which the portable device is accommodated in the accommodation section.

* * * * *